(12) United States Patent
Wang et al.

(10) Patent No.: US 11,375,559 B2
(45) Date of Patent: Jun. 28, 2022

(54) COMMUNICATION CONNECTION METHOD, TERMINAL DEVICE AND WIRELESS COMMUNICATION SYSTEM

(71) Applicant: Guangdong Virtual Reality Technology Co., Ltd., Guangzhou (CN)

(72) Inventors: Guotai Wang, Guangzhou (CN); Jingwen Dai, Guangzhou (CN); Jie He, Guangzhou (CN); Yiqun Wu, Guangzhou (CN); Lini Cai, Guangzhou (CN)

(73) Assignee: Guangdong Virtual Reality Technology Co., Ltd., Guangzhou (CN)

( * ) Notice: Subject to any disclaimer, the term of this patent is extended or adjusted under 35 U.S.C. 154(b) by 328 days.

(21) Appl. No.: 16/727,976

(22) Filed: Dec. 27, 2019

(65) Prior Publication Data
US 2020/0137815 A1 Apr. 30, 2020

Related U.S. Application Data

(63) Continuation of application No. PCT/CN2019/104161, filed on Sep. 3, 2019.

(30) Foreign Application Priority Data

Sep. 3, 2018 (CN) .......................... 201811021765.8
Sep. 3, 2018 (CN) .......................... 201811023511.X
Nov. 16, 2018 (CN) .......................... 201811368617.3

(51) Int. Cl.
*G06F 15/16* (2006.01)
*H04W 76/14* (2018.01)
(Continued)

(52) U.S. Cl.
CPC .......... *H04W 76/14* (2018.02); *G06V 10/143* (2022.01); *H04W 84/18* (2013.01)

(58) Field of Classification Search
CPC ..... H04W 76/14; H04W 84/18; G06V 10/143
(Continued)

(56) References Cited

U.S. PATENT DOCUMENTS 8,187,100 B1 * 5/2012 Kahn .................... A63F 13/211
705/59
2003/0225834 A1 * 12/2003 Lee ..................... G06Q 10/107
709/204
(Continued)

FOREIGN PATENT DOCUMENTS

CN 106468993 X 3/2017
CN 107578487 A 1/2018
(Continued)

OTHER PUBLICATIONS

International Search Report (PCT/CN2019/104161); dated Nov. 21, 2019.

*Primary Examiner* — Atta Khan
(74) *Attorney, Agent, or Firm* — W&G Law Group

(57) ABSTRACT

The present disclosure discloses a communication connection method. The method includes: capturing an image containing a marker and identifying the marker in the image; acquiring an identifier of a controller corresponding to the marker when the marker is a controller marker, the identifier being used for pairing during a communication connection with the controller; and establishing the communication connection with the controller based on the identifier.

17 Claims, 9 Drawing Sheets

(51) Int. Cl.
*G06V 10/143* (2022.01)
*H04W 84/18* (2009.01)

(58) Field of Classification Search
USPC .......................................................... 709/227
See application file for complete search history.

(56) References Cited

U.S. PATENT DOCUMENTS

| | | | | |
|---|---|---|---|---|
| 2008/0279164 | A1* | 11/2008 | Wu | H04W 48/16 |
| | | | | 370/338 |
| 2013/0251124 | A1* | 9/2013 | DeLuca | H04M 3/42365 |
| | | | | 379/93.01 |
| 2013/0328762 | A1* | 12/2013 | McCulloch | G02B 27/017 |
| | | | | 345/156 |
| 2014/0201256 | A1* | 7/2014 | Pinheiro | H04M 1/72415 |
| | | | | 709/201 |
| 2015/0091923 | A1* | 4/2015 | Luckett, Jr. | G06F 3/011 |
| | | | | 345/522 |

FOREIGN PATENT DOCUMENTS

| | | |
|---|---|---|
| CN | 107610238 X | 1/2018 |
| JP | 5638789 A | 12/2014 |

\* cited by examiner

COMMUNICATION CONNECTION METHOD, TERMINAL DEVICE AND WIRELESS COMMUNICATION SYSTEM

CROSS-REFERENCE TO RELATED APPLICATIONS

This application is a continuation application of International Application No. PCT/CN2019/104161, filed on Sep. 3, 2019, which claims priority to Chinese Patent Application No. 201811021765.8 filed on Sep. 3, 2018, Chinese Patent Application No. 201811023511.X filed on Sep. 3, 2018, and Chinese Patent Application No. 201811368617.3 filed on Nov. 16, 2018. The disclosures of the aforementioned patent applications are hereby incorporated by reference in their entireties.

TECHNICAL FIELD

The present disclosure relates to the field of computer technologies, and in particular, to a communication connection method, a terminal device, and a wireless communication system.

BACKGROUND

With the development of Virtual Reality (VR) and Augmented Reality (AR) technologies, terminal devices related to virtual reality and augmented reality have gradually entered people's lives and work. A user can observe various three-dimensional virtual content through a VR/AR device that is worn and can also interact with displayed three-dimensional virtual content through a controller or the like. Prior to using the controller for interaction, a manual operation is usually required to establish a communication connection between the VR/AR device and the controller, which result in complex operations.

SUMMARY

In an embodiment of the present disclosure, a communication connection method is provided. The method includes: capturing an image containing a marker and identifying the marker in the image; acquiring an identifier of a controller corresponding to the marker when the marker is a controller marker, the identifier being used for pairing during a communication connection with the controller; and establishing the communication connection with the controller based on the identifier.

In an embodiment of the present disclosure, a wireless communication system is further provided, which includes: at least one marker; at least one controller provided with the at least one marker; and at least one terminal device configured to identify the at least one marker provided on the at least one controller, acquire an identifier of each of the at least one controller, and establish a communication connection with the at least one controller based on the identifier.

In an embodiment of the present disclosure, a method for displaying virtual content is provided. The method includes: identifying a scene marker, and determining a current scene in which the terminal device is located; acquiring, from a server corresponding to the current scene, scene data that matches the current scene; and displaying the virtual content based on the scene data.

In an embodiment of the present disclosure, a system for displaying virtual content is provided, which includes: at least one scene marker for being disposed in at least one scene; at least one server for storing scene data of the at least one scene; and at least one terminal device configured to establish a communication connection with the at least one server, identify the scene marker, determine a current scene based on the scene marker, acquire the scene data matching the current scene from the connected server, and display the virtual content according to the scene data.

In an embodiment of the present disclosure, an information prompting method is further provided. The method includes: acquiring a target image captured by a camera, which image includes the marker; acquiring a relative spatial position relationship between the terminal device and the marker based on the target image; and generating prompt information when the relative spatial position relationship satisfies a preset condition. The preset condition is at least one condition of a position and a pose of the marker.

In one embodiment, a terminal device is provided and includes a memory and a processor. The memory is coupled to the processor. The memory stores a computer program. The computer program, when being executed by the processor, causes the processor to execute the method as described above.

In one embodiment, a computer readable medium is provided, and a program code is stored in the computer readable storage medium. The program code can be invoked by a processor to execute the method as described above.

Details of one or more embodiments of the present disclosure are set forth in the accompanying drawings and description below. Other features, objects, and advantages of the present disclosure will be apparent from the description and appended claims.

BRIEF DESCRIPTION OF DRAWINGS

In order to more clearly illustrate the technical solutions in the embodiments of the present disclosure, drawings used in the description of the embodiments will be briefly described below. Obviously, the drawings in the following description are only some embodiments of the present disclosure, and other drawings can also be obtained by those skilled in the art based on these drawings without paying any creative effort.

DESCRIPTION OF EMBODIMENTS

The technical solutions in the embodiments of the present disclosure are clearly and completely described in the following with reference to the accompanying drawings in the embodiments of the present disclosure. It is obvious that the described embodiments are only a part of the embodiments of the present disclosure but not all embodiments. All other embodiments obtained by a person of ordinary skill in the art based on the embodiments of the present disclosure without any creative effort are within the scope of the present disclosure.

Figure 1:
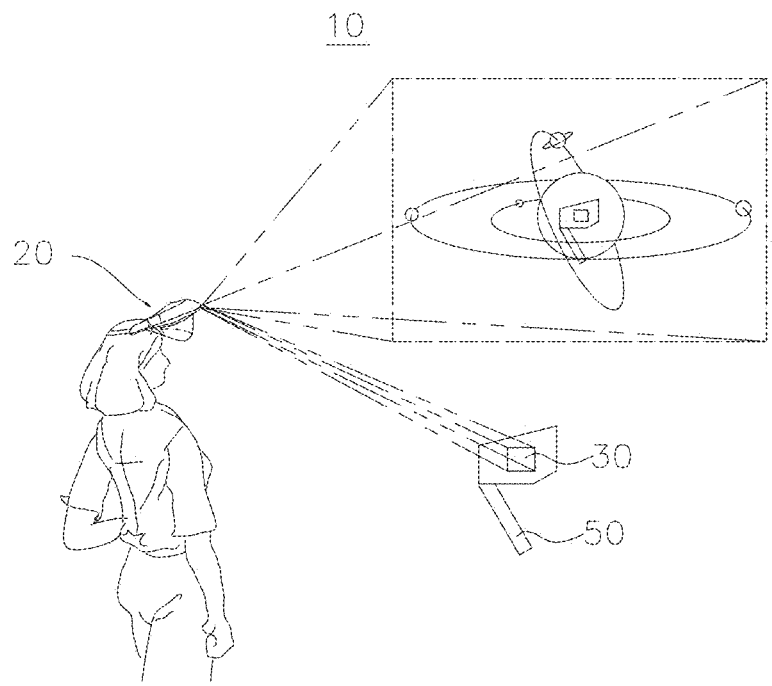
FIG. 1 is an application scene diagram of a communication connection method according to an embodiment.

Referring to FIG. 1, an interaction system 10 provided by an embodiment of the present disclosure includes a terminal device 20 and a controller 50. The controller 50 is provided with a marker 30, and the terminal device 20 is provided with a camera. When the marker 30 is within a visual range of the camera, the camera can capture an image containing the marker 30, and the terminal device may identify the marker 30 in the image. The terminal device 20 may determine that the marker 30 is a marker on the controller 50 and acquire an identifier of the controller 50 corresponding to the marker 30. The identifier may be an identifier used for pairing when the terminal device 20 establishes a communication connection with the controller 50, and the terminal device 20 may establish the communication connection with the controller 50 based on the identifier.

In some embodiments, the marker 30 has a pattern of topology. The topology refers to a connected relationship between sub-markers and feature points in the marker 30, and the topology represents identity information of the marker 30. The marker 30 may also be other patterns, which are not limited herein, as long as they can be identified and tracked by the terminal device 20.

In some embodiments, the terminal device 20 may be a head mounted display device, or may be a mobile device such as a mobile phone or a tablet computer. When the terminal device 20 is a head mounted display device, the head mounted display device may be an integrated head mounted display device or a head mounted display device connected with an external electronic device. The terminal device 20 may also be a smart terminal such as a mobile phone connected to an external/plug-in head mounted display device, that is, the terminal device 20, as a processing and storage device of the head mounted display device, may be inserted into or connected to the head mounted display device exteriorly, so as to display a virtual object in the head mounted display device.

Figure 2:
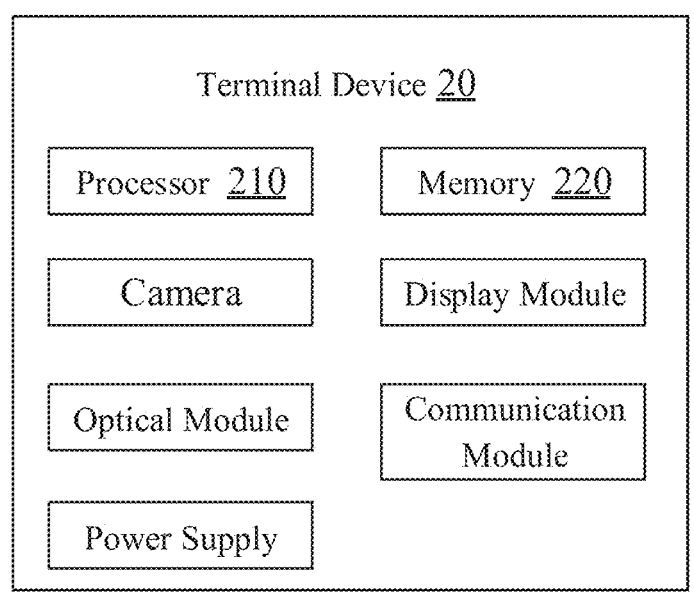
FIG. 2 is a structural block diagram of a terminal device according to an embodiment.

Referring to FIG. 2, in some embodiments, the terminal device 20 can include a processor 210 and a memory 220. The memory 220 stores one or more computer programs, which can be configured to be executed by the processor 210 to implement methods described in the embodiments of the present disclosure.

The processor 210 includes one or more processing cores. The processor 210 uses various interfaces and lines to connect various portions in the entire terminal device 100 and executes various functions of the terminal device 100 and processes data by running or executing instructions, programs, code sets or instruction sets stored in the memory 220 and calling data stored in the memory 220. The processor 210 can be implemented in at least one hardware form of a digital signal processing (DSP), a field programmable gate array (FPGA), and a programmable logic array (PLA). The processor 210 may integrate one or a combination of a central processing unit (CPU), a graphics processing unit (GPU), a modem, and the like. The CPU mainly deals with an operating system, a user interface and applications, etc.; the GPU is responsible for rendering and drawing of displayed content; and the modem is configured to process wireless communication. It is also possible that the above modem may not be integrated into the processor 210, but is implemented by a single communication chip.

The memory 220 includes random access memory (RAM) and read only memory (ROM). The memory 220 can be used to store instructions, programs, code, code sets, or instruction sets. The memory 220 can include a storage program area and a storage data area. The storage program area can store an instruction for implementing the operating system, an instruction for implementing at least one function (such as a touch function, a sound playing function, an image playing function, etc.), instructions for implementing various method embodiments described below, and the like. The storage data area can also store data created by the terminal device 20 in use, and the like.

In one embodiment, the terminal device 20 is a head mounted display device, and further includes one or more of following components: a display module, an optical module, a communication module and a power supply. The display module can include a display control unit. The display control unit is used to receive an image of virtual content that has been rendered by the processor, and to display and project the image onto the optical module, so that a user can view the virtual content through the optical module. The display module may be a display screen or a projection device or the like, for displaying the image. The optical module can adopt an off-axis optical system or a waveguide optical system, and the image of the display module can be projected to eyes of the user after passing through the optical module. The user can observe, through the optical module, the image projected by the display module. In some embodiments, the user can also observe real environment through the optical module and feel the visual effect of superimposition of the virtual content and the real environment. The terminal device is in a communication connection with an interaction device through the communication module, to perform interaction of information the instructions. The power supply can supply power to the entire terminal device to ensure normal operations of various components of the terminal device.

In one embodiment, a camera disposed on the terminal device 20 may be an infrared camera. The marker 30 is covered with an infrared filter externally, such that pattern of the marker is invisible to the user. By irradiating the marker 30 with emitted infrared light, the camera may capture an image of the marker 30, which reduces impact on the image of the marker by visible light in an environment, thereby improving accuracy of positioning and tracking.

Figure 3:
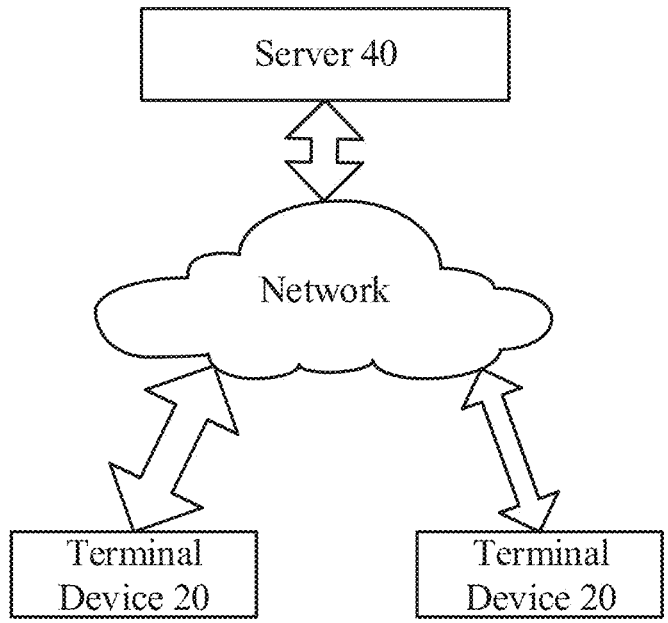
FIG. 3 is a schematic diagram of a communication connection between a terminal device and a server according to an embodiment.

Referring to FIG. 3, in one embodiment, the terminal device 20 can also be in a communication connection with a server 40 via a network. The terminal device 20 runs a client of an AR/VR application, and the server 40 runs a server of the AR/VR application corresponding to the client. The server 40 may store identity information of each marker, virtual image data bound to the marker corresponding to the identity information, and the like. The terminal device 20 and the server 40 can transmit data to each other.

Figure 4:
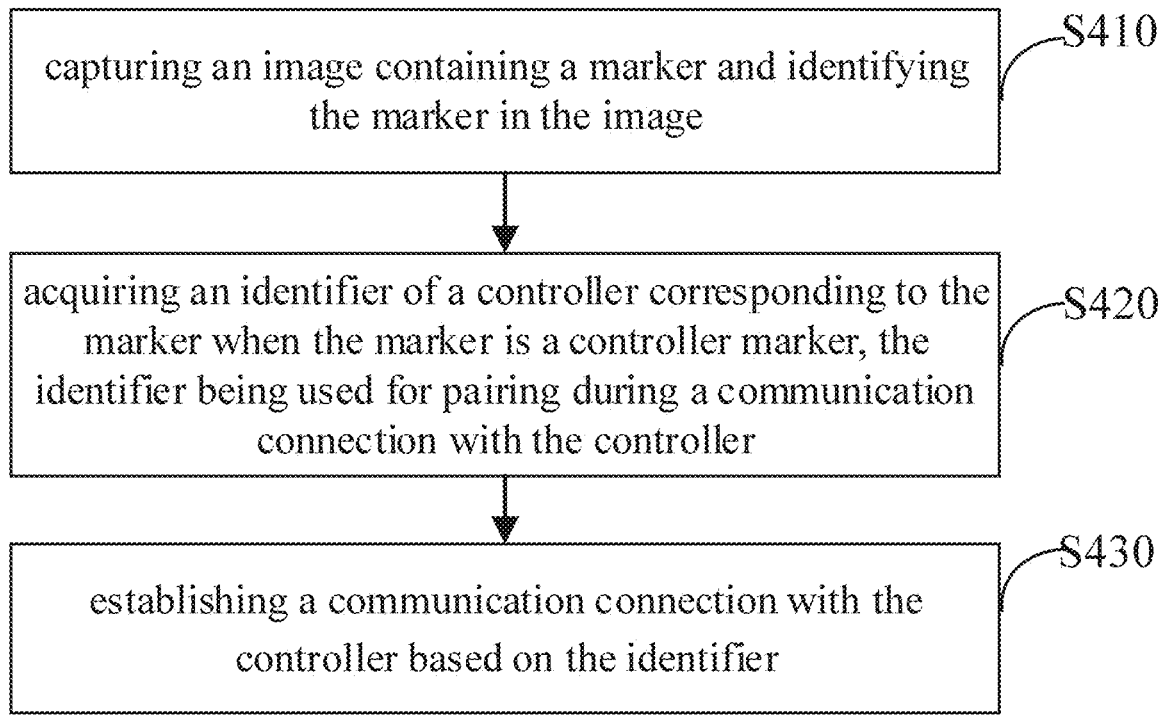
FIG. 4 is a flow chart of a communication connection method according to an embodiment.

Referring to FIG. 4, an embodiment of the present disclosure further provides a communication connection method, which is performed by the terminal device. The communication connection method may include blocks S410 to S430.

At block S410, an image containing a marker is captured, and the marker in the image is identified.

The camera of the terminal device can capture an image of the marker in the visual range. In one example, the marker can include at least one sub-marker, and the sub-marker is a pattern having a certain shape. Distribution rules of sub-markers in different markers are different, such that each marker has different identity information. The terminal device may acquire the identity information corresponding to the marker by identifying the sub-marker included in the marker, and the identity information may be a code that can be used to uniquely identify the marker.

In some embodiments, the markers included in a real scene may include, but not limited to, a scene marker, a content display marker, a controller marker, and the like. The scene marker can be used to be identified by the terminal device and the terminal device can display a virtual scene corresponding thereto. The content display marker can be used to be identified by the terminal device and the terminal device can display a virtual content image corresponding thereto. The controller marker can be used to be identified by the terminal device and the terminal device can acquire information such as position and pose of the controller. Different types of markers respectively correspond to different identity information.

At block S420, an identifier of a controller corresponding to the marker is acquired when the marker is determined as a marker of the controller, wherein the identifier is used for pairing during the communication connection between the controller and the terminal device.

The terminal device may acquire the identity information of the marker. When the marker is determined as a marker provided on the controller according to the identity information, the terminal device can acquire identity of the controller that is provided with the marker, and the position and pose of the controller relative to the terminal device according to the image containing the marker.

In one embodiment, the terminal device may acquire the identifier of the controller that is provided with the marker. The identifier may be used for pairing during the communication connection between the controller and the terminal device. The communication connection can be a wireless communication connection such as Bluetooth, Wi-Fi, infrared or radio frequency, and it can also be other wireless communication connection or wired communication connection, which is not limited herein. In an implementation, when the controller is in a communication connection with the terminal device through Bluetooth or the like, the identifier thereof may be radio frequency identification (RFID), and the controller can pair with the terminal device by broadcasting the RFID, and then establish the communication connection with the terminal device.

In some embodiments, the terminal device may acquire the identifier by scanning broadcast content of the controller in the environment. In other embodiments, the terminal device may also acquire the identifier by searching in a backend database based on the controller marker after being connected to a wireless router in current venue.

At block S430, a communication connection is established with the controller based on the identifier.

The identifier is a certificate for performing identity authentication between the terminal device and the controller. In some embodiments, the identifier can be directly used for establishing the communication connection between the terminal device and the controller. In other embodiments, the identifier can only be used for pairing, the terminal device may confirm an object (i.e. the controller) that needs to be communicatively connected according to the identifier, and the terminal device may establish the communication connection with the object by other means.

In a possible scene, for example, in an augmented reality museum, a plurality of booths with controllers may be placed in an exhibition hall. A user wearing a terminal device may be located around one booth in the exhibition hall, the terminal device may capture an image of a marker of a controller on the booth through the camera to acquire identity information of the marker. The terminal device may determine that the marker belongs to a controller based on the identity information of the marker, and obtain an identifier of the controller to establish a communication connection with the controller. After establishing the communication connection, the terminal device and the controller can transmit data to each other, and the user can use the controller to interact with virtual content displayed in the display module of the terminal device. In one embodiment, in the exhibition hall, a plurality of terminal devices may communication connect with different controllers of other booths at the same time, a multi-player interaction within the same virtual scene can be achieved by data sharing and real-time synchronizing update of content among the plurality of terminal devices through routers in the exhibition hall.

The terminal device may automatically connect with a controller by scanning a marker on the controller, so as to interact with the virtual content, which is easy to operate.

Figure 5:
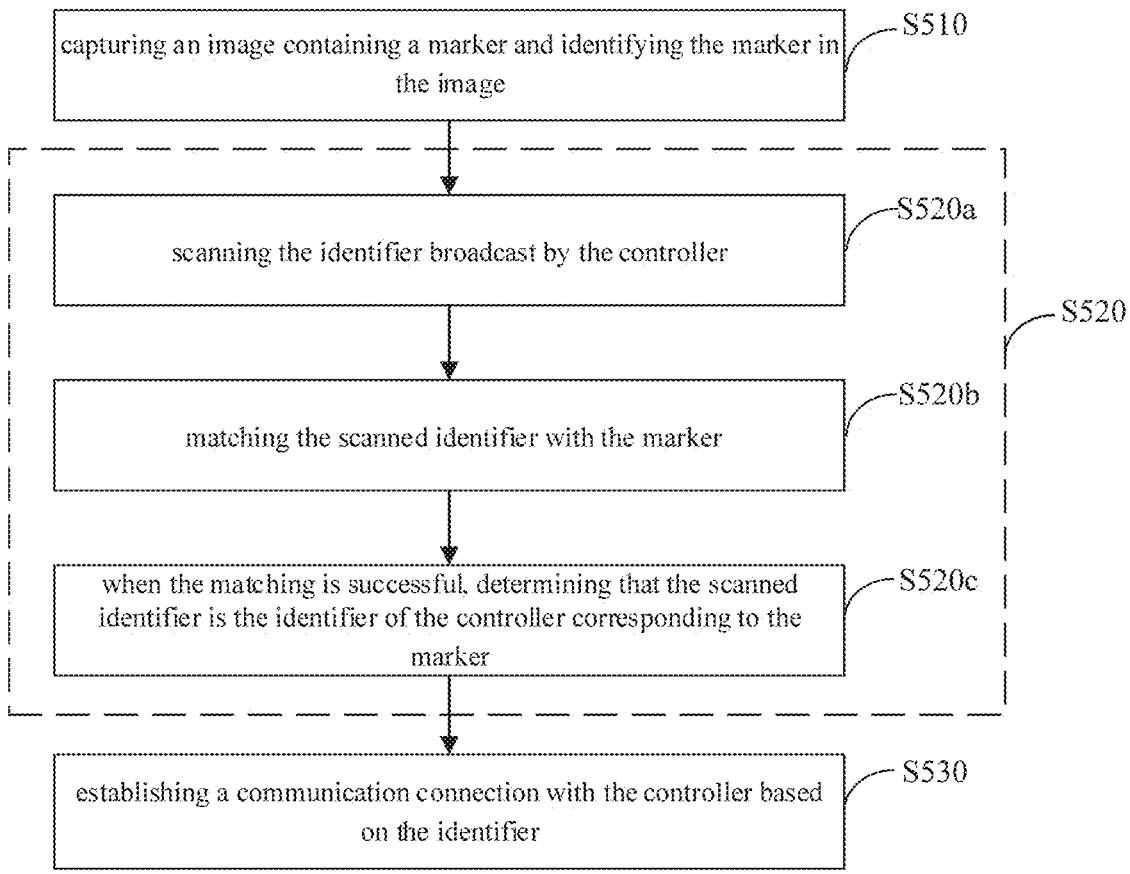
FIG. 5 is a flow chart of a communication connection method according to another embodiment.

Referring to FIG. 5, an embodiment of the present disclosure provides another communication connection method which is performed by the terminal device, the method includes steps S510 to S530.

At step S510, an image containing a marker is captured, and the marker in the image is identified.

The terminal device may acquire identity information of the marker in the image, and search in a database based on the identity information to determine a category to which the marker belongs.

At step S520, an identifier of a controller corresponding to the marker is acquired when the marker is determined as a marker of the controller.

In one embodiment, the step S520 may further include steps S520a, S520b, and S520c.

At step S520a, the identifier broadcast by the controller is scanned.

The terminal device may perform scanning to acquire the identifier (which may be an RFID) broadcast by the controller (e.g., via Bluetooth broadcast). In some embodiments, the user can press a communication button on the controller to make the controller enter into a connectable state and broadcast its identifier. It is also possible that the controller can broadcast the identifier in real time without being operated by the user. The terminal device can turn on the scanning function, and scan the identifier broadcasted by the controller in real time. In some embodiments, the terminal device can always turn on the scanning function to scan the identifier.

In some embodiments, when the terminal device has identified the marker of the controller, the terminal device may display connection prompt information, or play voice of connection prompt information, to prompt the user to operate the controller, in such a manner that the controller may enter the connectable state and broadcast its identifier.

At step S520b, the scanned identifier is matched with the marker.

At step S520c, when the matching is successful, the scanned identifier is determined to be the identifier of the controller corresponding to the marker.

In some embodiments, the identifier may be a 16-bit UUID (Universally Unique Identifier). The identifier may include vendor-specific information and a code corresponding to the marker of the controller that broadcasts the identifier. For example, the code of a marker provided on a controller is "7", the identifier broadcast by the controller may be "0xF0007", and "0xF000" is the vendor-specific information corresponding to the controller. Since the vendor-specific information is included in the identifier, different types of controllers can be easily distinguished.

The terminal device matches the identifier with the marker, and the code of the marker contained in the identifier can be compared with the code of the identified marker in the captured image. When the two are consistent, the terminal device may determine that the scanned identifier is broadcast by the controller corresponding to the identified marker, and the terminal device can be in communication connection with the controller through the identifier. When the two are inconsistent, the terminal device may determine that the scanned identifier is broadcast by the other controller, and the terminal device may discard the scanned identifier and scan again. In one implementation, the terminal device can scan a plurality of identifiers at the same time and can match the scanned identifiers with the identified marker one by one, so as to determine the identifier corresponding to the controller operated by the user.

In an embodiment, the identifier may further include a scene identification of a scene in which the controller is currently located, and different scenes may correspond to different scene identifications. For example, the scene identification corresponding to a game scene is 001, the scene identification corresponding to an education scene is 005. The scene identification may be part of the identifier, and the terminal device may parse the scanned identifier to obtain the scene identification. The terminal device can match the scene identification contained in the scanned identifier with the scene identification of the current scene. When the two are consistent, it indicates that the identifier scanned by the terminal device is broadcast by the controller in the current scene instead of being broadcast by the controller in other scenes. After the scene identification is successfully matched, the identifier is matched with the identified marker to avoid misconnection between the terminal device and a controller that is pairing in other scenes. In other embodiments, the identifier may be matched with the identified marker first, and after the matching is successful, matching of the scene identification is performed.

In some embodiments, each scene may be provided with a scene marker, for example, the scene marker may be placed at an entrance of an exhibition hall, a doorway of a room, or the like. The terminal device may capture an image of a scene marker of the current scene and identifies the scene marker to obtain the scene identification of the current scene. When the terminal device identifies that the captured image contains the scene marker, the terminal device generates a virtual scene corresponding to the scene marker and displays the virtual scene through the display module, such that the user can observe the virtual scene is superimposed on the real scene.

In one embodiment, each scene can be provided with a router. The terminal device can be connected to the router corresponding to the current scene, so as to download virtual content data corresponding to the current scene from the server, to construct and display the virtual content. The terminal device can obtain, according to the scene marker, a network connection password corresponding to the current scene, and establish a network connection with the router corresponding to the current scene with the network connection password. In an implementation, the network connection password of the router of each scene may correspond to a scene marker of the scene. For example, the network connection password may be the identity information of the scene marker of the scene, i.e., the scene identification, or may be a character string corresponding to the scene identification. The terminal device can obtain the scene identification based on the identified scene marker and obtain the network connection password corresponding to the scene identification, so as to be connected to the router of the current scene.

In some embodiments, a wireless router in a scene can form a wireless mesh network with a plurality of controllers of the scene. The terminal device can access to the wireless mesh network corresponding to the current scene through the connected wireless router, to acquire a state of each node (i.e. controller) in the current scene. When the controller enters the connectable state, the terminal device may determine whether other controllers are pairing in the wireless mesh network. When the other controllers are pairing, the terminal device may display wait prompt information to prompt the user to wait for completion of pairing of other controllers. When there is no other controller being paired or the pairing of other controller is completed, the terminal device can turn on the scanning function to scan the identifier broadcast by the controller which enters the connectable state to pair with the controller. In the wireless mesh network of the scene, there is always only one terminal device that turns on the scanning, and only one controller broadcasts the identifier, to ensure that there is no misconnection between the terminal device and the controller in the same scene.

In an implementation, the controller can broadcast information of entering the pairing state to the wireless mesh network while broadcasting the identifier, in order to enable other devices in the wireless mesh network to get that there is already a controller that has entered the pairing state.

Figure 6:
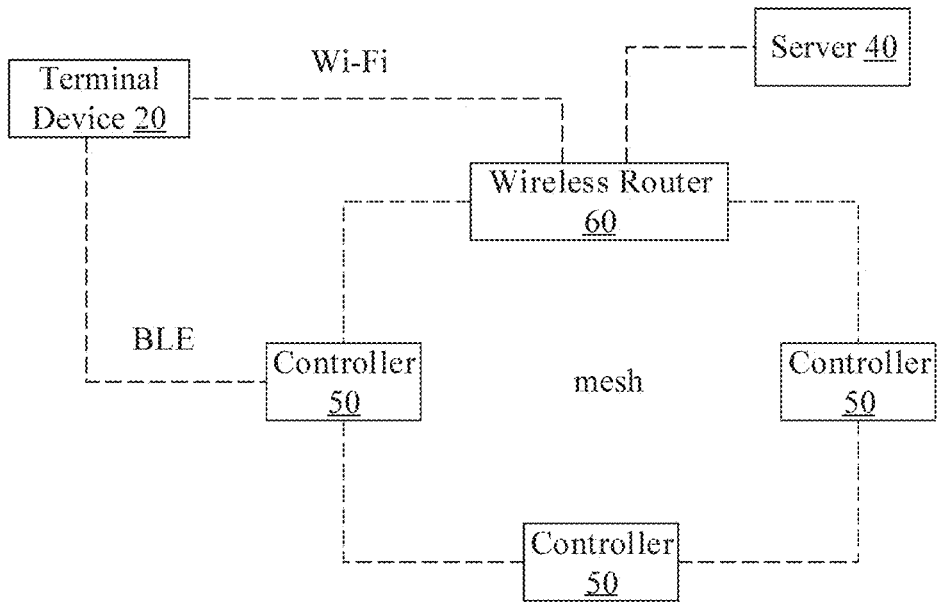
FIG. 6 is a schematic diagram of a wireless mesh network according to an embodiment.

FIG. 6 is a schematic diagram of a wireless mesh network according to an embodiment. A plurality of controllers 50 can establish communication connections with each other. A wireless router 60 can form a wireless mesh network with the plurality of controllers 50, and a state of each controller 50 is fed back to the server 40 in the background by the wireless router 60, such that maintenance personnel can view the state of the controller 50 in each scene in the real environment through a console connected to the server 40, such as whether it is needed to be charged or to replace a battery, whether there is a malfunction or loss, etc., to facilitate timely maintenance of the device.

In an implementation, the wireless router 60 can have both Wi-Fi and Bluetooth communication functions, the wireless router 60 and the terminal device 20 can be wirelessly connected via Wi-Fi, a wireless communication connection between the wireless router 60 and the controller 50 can be established via Bluetooth Mesh, a wireless communication connection between the respective controllers 50 can be established via Bluetooth Mesh, so as to constitute the wireless mesh network, and the terminal device 20 and the controller 50 can be wirelessly connected via Bluetooth BLE (Bluetooth Low Energy). It should be noted that, the network connection between respective devices can also adopt other manners, which are not limited in the present disclosure.

At step S530, a communication connection is established with the controller based on the identifier.

In one embodiment, the terminal device can detect a position of the controller. When the controller is detected to be in a preset position, or when a movement of the controller is detected to meet a preset motion trajectory, the controller is determined to be a controller that requires for a communication connection, the terminal device may match the marker on the controller with the scanned identifier to establish communication connection with the controller. The preset position may be a spatial position or a space area where the controller is allowed to enter a communicable connection state.

In some embodiments, the terminal device may capture the image containing the marker of the controller through the camera, and identify the marker in the image to obtain the relative position and pose between the marker and the terminal device. When the controller is detected to be in the preset position according to the relative position and pose, the terminal device may automatically turn on the scanning function and establish the communication connection with the controller. The user can simply pick up the controller to achieve the communication connection between the terminal device and the controller, thereby improving connection efficiency, making interaction process smoother and avoiding misconnections between other controllers and the terminal device.

In some embodiments, when the terminal device has acquired pairing completion information broadcast by the controller, connection result prompt information may be displayed to prompt successful connection or connection failure between the terminal device and the controller. Each controller being paired in the wireless mesh network will broadcast the pairing completion information to the wireless mesh network at the end of pairing, and the terminal device can get the pairing result of the controller through the connected wireless router. In an implementation, other terminal device in the current scene can also obtain the pairing completion information and display the connection result prompt information for prompting other users that the similar devices have been paired.

In one implementation, when the terminal device detects that the controller is placed back to an initial position, such as a placement position of the controller on the booth, the terminal device can consider that use of the controller has ended, and then disconnect from the controller.

In some embodiments, when the terminal device detects that the pose of the controller acquired by an Inertial Measurement Unit (IMU) has not changed for a period of time, the terminal device can consider that the current controller is in an unused state, and then disconnect from the controller.

In some embodiments, when the terminal device detects that a new controller is located at the preset position, the terminal device may disconnected with the original controller, and establish a communication connection with the new controller located in the preset position, to complete replacement between the controllers.

The communication connection method provided by the above embodiments can avoid the misconnection, and improve the matching accuracy between the terminal device and the controller.

Figure 7:
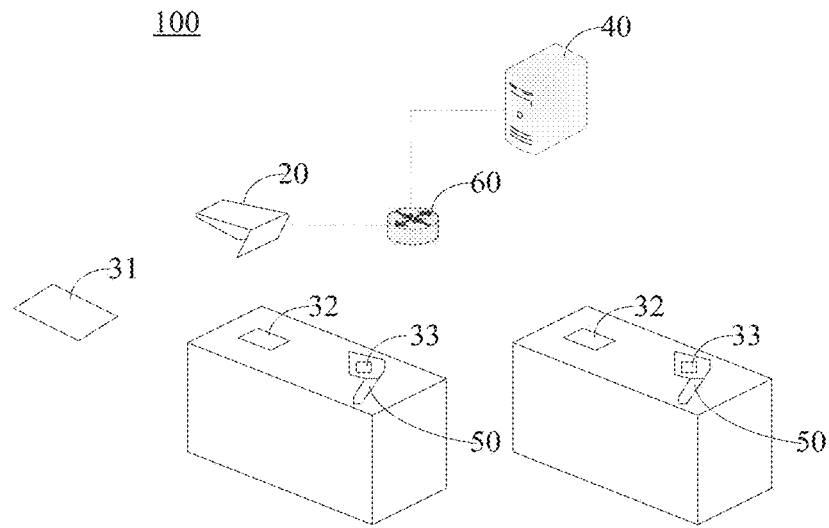
FIG. 7 is a schematic diagram of a wireless communication system according to an embodiment.

Referring to FIG. 7, a wireless communication system 100 according to an embodiment of the present disclosure includes at least one marker, at least one controller 50, a terminal device 20, a wireless router 60, and a server 40 that are distributed in the real environment. The wireless router 60 can establish communication connections with the terminal device 20 and the controller 50 respectively, and can also be in a communication connection with the server 40 of a background maintenance data center. In some embodiments, the markers can include a scene marker 31, a content display marker 32, and a controller marker 33, etc. Different categories of markers may be used to implement different functions.

In one implementation, the scene marker 31 can be placed at an entrance of each scene, such that the terminal device 20 can identify the scene marker 31 and display a virtual scene corresponding thereto. For example, in a multi-theme augmented reality museum, there are many exhibition themes such as ocean, grassland, and starry sky. Different themes correspond to different areas in the museum, and one scene marker 31 corresponding to a theme of each area may be provided at an entrance of the area. When the terminal device has identified the scene marker located at an entrance of an area of the ocean theme, an virtual scene of ocean may be displayed to the user through the display module; when the user moves from the area of the ocean theme to an area of the starry sky theme, the terminal device may identify the scene marker located at the entrance of the area of the starry sky theme, an virtual scene of starry sky may be replaced the previous virtual scene of the ocean. In some embodiments, the terminal device 20 may identify the scene marker 31 and acquire a connection password of the wireless router 60 in the scene to which the scene marker 31 belongs, in order to establish the communication connection with the wireless router 60 of the current environment.

The content display marker 32 can be disposed on each booth in the real environment, the terminal device 20 can identify the content display marker 32 and display a virtual object corresponding to the content display marker 32, such as virtual exhibits, exhibit introductions, and the like.

The controller marker 33 can be disposed on the controller 50, the terminal device 20 may identify the controller marker 33 to acquire position and pose of the controller 50. In some embodiments, the terminal device 20 may display a virtual object corresponding to the controller marker 33 to interact with other virtual content. For example, in a game scene, the terminal device 20 may display a corresponding virtual game item according to the controller marker 33, the user can implement interaction of the virtual game item with other virtual content through the control controller 50.

In one implementation, the terminal device 20 can identify the marker, and obtain the identity information of the marker to determine the category of the marker (the scene marker 31, the content display marker 32, the controller marker 33, etc.). In some embodiments, the terminal device 20 can establish the communication connection with the controller 50 after identifying the controller marker 33.

Figure 8:
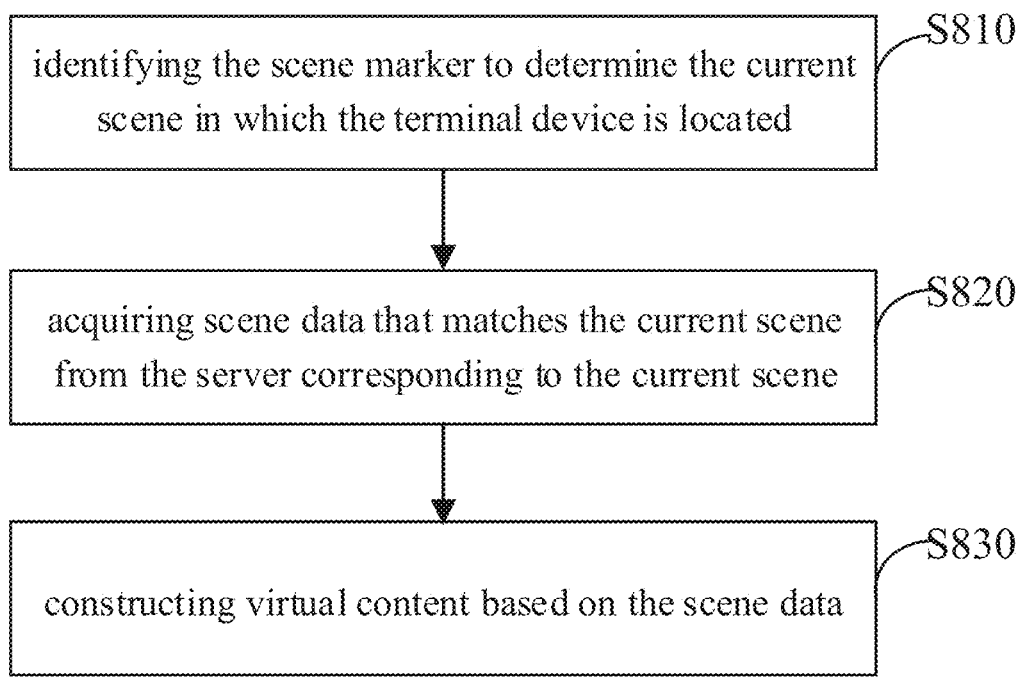
FIG. 8 is a flow chart of a method for displaying virtual content according to an embodiment.

Referring to FIG. 8, a method for displaying the virtual content according to an embodiment of the present disclosure which is performed by the terminal device, the method may include steps S810 to S830.

At step S810, the scene marker is identified to determine the current scene in which the terminal device is located.

The scene marker is provided at the entrance of the real scene area. Different scenes can be provided with different scene markers, and the scene markers can be in one-to-one correspondence with the scenes. The terminal device may identify the scene marker, and acquire the scene with data corresponding to the identified scene marker, that is, the scene in which the terminal device is currently located. In some embodiments, the terminal device may further acquire the position and pose information of the terminal device relative to the scene marker according to the image containing the scene marker, to determine the position and pose of the terminal device in the entire real environment.

At step S820, scene data that matches the current scene is acquired from the server corresponding to the current scene.

The terminal device may determine the current scene, and acquire scene data matching the current scene from the server corresponding to the current scene. For example, when the current scene in which the terminal device is located is the ocean theme scene, the terminal device can establish the communication connection with a server corresponding to the ocean theme scene and download the scene data related to the ocean theme from the server.

In some embodiments, the scene data can include model data, which can be used to construct the virtual content that matches the current scene. The model data can include vertex data, textures, mapping, and the like of the three-dimensional virtual content. For example, the current scene is the ocean theme scene, and the scene data may include three-dimensional model data of a virtual underwater world and model data of virtual ocean creatures such as coral reefs, fish stocks, and ocean plants.

At step S830, virtual content is constructed based on the scene data.

The terminal device may load the scene data corresponding to the current scene, and construct the virtual content corresponding to the current scene according to the scene data, and display the virtual content through the display module. The virtual content may include at least one virtual scene and at least one virtual object, the virtual object may be static or dynamic.

For example, the terminal device may download the scene data matching the ocean theme scene from the server, construct the three-dimensional virtual scene of the ocean according to the scene data and display the virtual scene. At the same time, the terminal device may also display, in the three-dimensional scene of the ocean, static virtual objects such as coral reefs and shipwrecks, and dynamic virtual objects such as fish schools and ocean plants. When user moves from the ocean theme scene to a fashion theme scene, the terminal device may download scene data matching the fashion theme scene from the server, construct a three-dimensional virtual scene of a stage according to the scene data and display the virtual scene. The terminal device may display, in the three-dimensional scene of the stage, static virtual objects such as art posters and costumes, and the dynamic virtual objects such as fashion catwalks and lights.

In some embodiments, the user can also interact with the virtual content by other manners such as gestures, operation controllers and the like. The server may synchronize data with other terminal devices to achieve multi-player interaction within the same virtual scene.

In some embodiments, a service desk for requesting use of the terminal device may also be provided. The user can apply for the use of the terminal device at the service desk, and the terminal device can be configured by the user or a service personnel, including user setting, wireless configuration, controller matching, hardware device installation, software setting startup, etc., or the terminal device can be automatically configured. After completion of the configuration of the terminal device, the terminal device can acquire user information to authenticate an identity of the user.

In the method of the above embodiments, the terminal device can automatically display the virtual content associated with the current scene by identifying the scene marker provided at a particular scene, thereby improving the visual effect.

Figure 9:
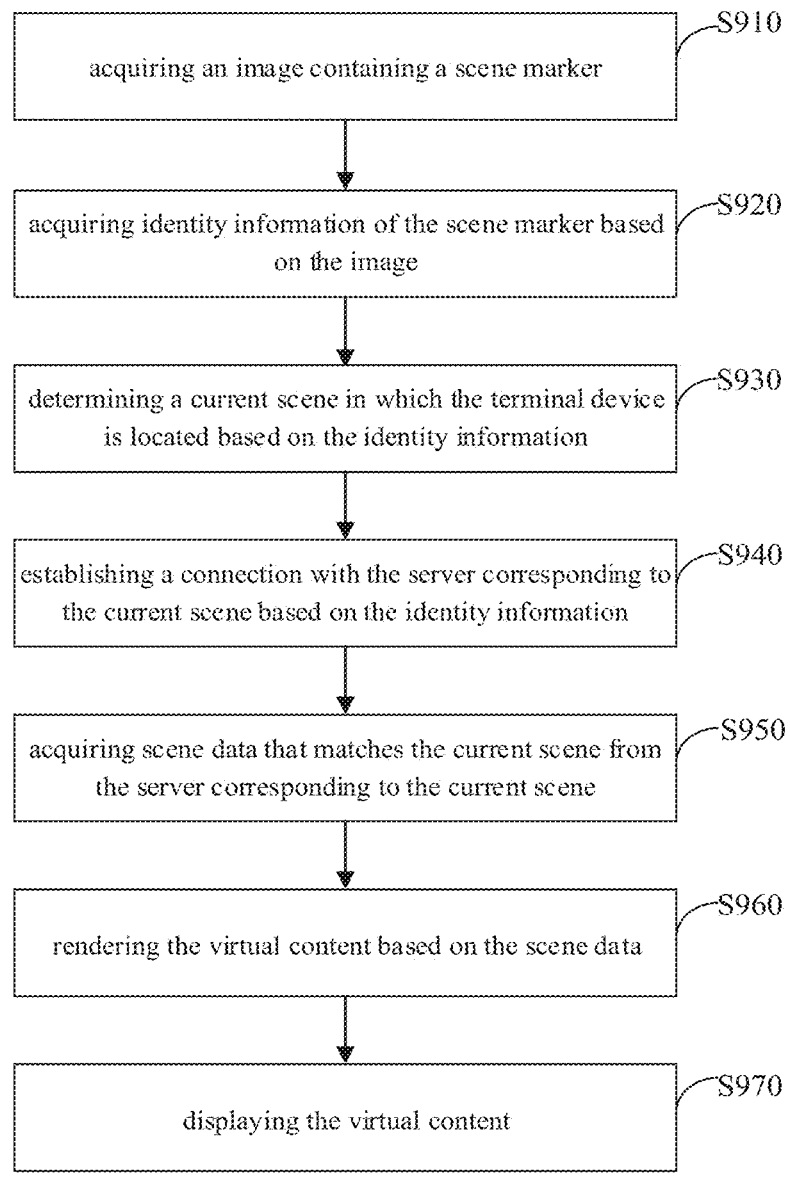
FIG. 9 is a flow chart of a method for displaying virtual content according to another embodiment.

Referring to FIG. 9, a method for displaying the virtual content according to another embodiment of the present disclosure which is performed by the terminal device may include following steps.

At step S910, an image containing a scene marker is acquired.

At step S920, identity information of the scene marker is determined based on the image.

The terminal device can capture the image containing the scene marker through a camera and identify the scene marker contained in the image, to obtain identity information corresponding to the scene marker. Different scene markers provided in different scenes correspond to different identity information.

At step S930, a current scene in which the terminal device is located is determined based on the identity information of the scene marker.

The scene marker provided at each scene is different. The scene identification corresponding to the identity information of the scene marker can be obtained, and the scene in which the terminal device is currently located is determined based on the scene identification. Different scenes have different scene identifications, and correspondence between the scene identification and the identity information of the scene marker may be pre-stored. For example, a scene marker provided in the ocean scene is different from a scene marker provided in the fashion scene. The identity information of the scene marker of the ocean scene is "010", the scene identification of the ocean scene is "01", the identity information of the scene marker of the fashion scene is "020", and the scene identification of the fashion scene is "02". The terminal device can obtain the corresponding scene identification based on the identity information of the identified scene marker, to determine whether the current scene is the ocean scene or the fashion scene, or other theme scenes.

At step S940, a connection with the server corresponding to the current scene is established based on the identity information.

The terminal device can be connected to the server corresponding to the current scene based on the acquired identity information of the scene marker. In some embodiments, each scene can be covered with a wireless network, the terminal device can access to the wireless network corresponding to the scene through the wireless router corresponding to the scene, and establish communication connection with the server. In one implementation, one server may correspond to a single scene or multiple different scenes, the terminal devices located in different scenes can respectively request the server to download the scene data corresponding to the scene in which it is located through the connected wireless network.

In one implementation, the terminal device may obtain the network connection password corresponding to the current scene based on the identity information of the scene marker, and establish a network connection with the router corresponding to the current scene with the network connection password.

At step S950, scene data that matches the current scene is acquired from the server corresponding to the current scene.

In some embodiments, the scene data can include a spatial map and model data. The spatial map may be a virtual map constructed according to the real environment, and may be used to position the terminal device in a real space.

The position and pose information of the terminal device in the real scene can be obtained. The position information may include position coordinates of the terminal device in the real scene, the position coordinates may be coordinates of a spatial coordinate system established with the scene marker as its origin. In addition to the position coordinates, a position of an area of the scene in which the terminal device is located may be included in the position information, the position of the area of the scene may be obtained through the spatial map. For example, the terminal device is currently in an educational scene, the terminal device may use the spatial map to obtain that the educational scene is located in a middle area of a second floor of a building. The pose information may include rotation and orientation of the terminal device.

In one implementation, the terminal device may capture the image containing the scene marker via the camera, identify the scene marker to acquire relative position and pose information between the terminal device and the scene marker, obtain a position of the scene marker in the real scene according to the spatial map, and determine the position and pose information of the terminal device in the real scene based on the relative position and pose information and the position of the scene marker in the real scene. When the terminal device is moving in the scene, the terminal device can also capture the image of the content marker to acquire position and pose information of the terminal device in the real scene based on the captured content marker. When the image of the scene marker or the content marker cannot be captured, the terminal device can also acquire the position and pose information of the terminal device in the real scene in real time via a Visual-Inertial Odometry (VIO).

At step S960, the virtual content is rendered based on the scene data.

The terminal device may load the scene data that matches the current scene, and construct a three-dimensional model of virtual content according to the model data contained in the scene data. The three-dimensional model may include a three-dimensional model of the virtual scene that matches the real scene, the virtual object and the like.

In some embodiments, the three-dimensional model of the virtual content may be rendered in real time according to the position and pose information of the terminal device in the real scene, and the rendered virtual content is displayed.

Rendering coordinates of the virtual content in the virtual space may be fixed relative to a world coordinate origin, and the rendering coordinates may be associated with the real scene. For example, the displayed virtual content is associated with the position of the marker provided in the scene, and may also match different areas of the real scene. When the user is located at different positions of the real scene, that is, when the position and pose information of the terminal device in the real scene is different, different virtual contents can be observed. For example, when the user is located at the entrance of the ocean scene, the terminal device may identify the scene marker, acquire the position and pose information relative to the scene marker, render a virtual entrance guide based on the position and pose information and display the virtual entrance guide, the user can observe the virtual entrance guide. When the user is located at different positions of the ocean scene or when the pose of the terminal device is changed, the terminal device can render and display different virtual ocean scenes and virtual ocean creatures.

At step S970, the virtual content is displayed.

The method for displaying the virtual content in the above embodiments renders the virtual content based on the position and pose information of the terminal device in real time, and displays different virtual content when the user is at a different position or the terminal device changes to a different viewing angle.

Figure 10:
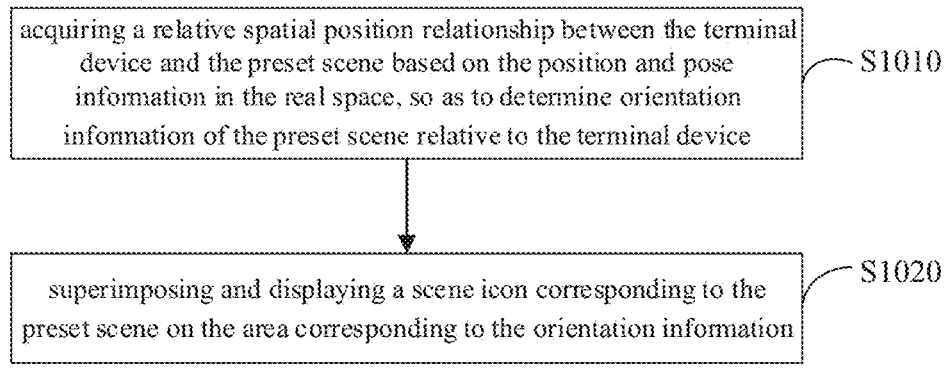
FIG. 10 is a flow chart for displaying a scene icon according to an embodiment.

Referring to FIG. 10, in an example, the above method for displaying the virtual content which is performed by the terminal device may further include following steps.

At step S1010, a relative spatial position relationship between the terminal device and the preset scene is acquired based on the position and pose information of the terminal device in the real space, so as to determine orientation information of the preset scene relative to the terminal device.

A plurality of scenes may be preset in the real space, the position and pose information of the terminal device in the real space may be acquired based on the spatial map corresponding to the real space, such that relative orientation information of each preset scene in the real space and the terminal device can be determined. The relative orientation information includes a direction and a distance of the preset scene relative to the terminal device.

At step S1020, a scene icon corresponding to the preset scene is superimposed and displayed on the area corresponding to the orientation information.

The terminal device can display the corresponding scene icon which is superimposed on an area corresponding to the orientation information of the preset scene in field of view of the terminal device. The field of view of the terminal device can be understood as a range that can be observed by the user through the terminal device. The scene icon can be used to identify different scenes. For example, the scene icon can be a name, a pattern, or a serial number of the scene. When the preset scene is determined within the field of view of the terminal device according to the orientation information of the preset scene and the position and pose information of the terminal device in the real space, the scene icon can be superimposed and displayed to guide the preset scene. The superimposing position of the scene icon in the real space can match the orientation information of the preset scene. For example, the scene icon can be superimposed and displayed in a position where the preset scene is located in the field of view, and can also be superimposed and displayed at an area matching the orientation in which the preset scene is located. According to the scene icon, the user can accurately get each scene in the field of view and the orientation in which each scene is located.

Figure 11A:
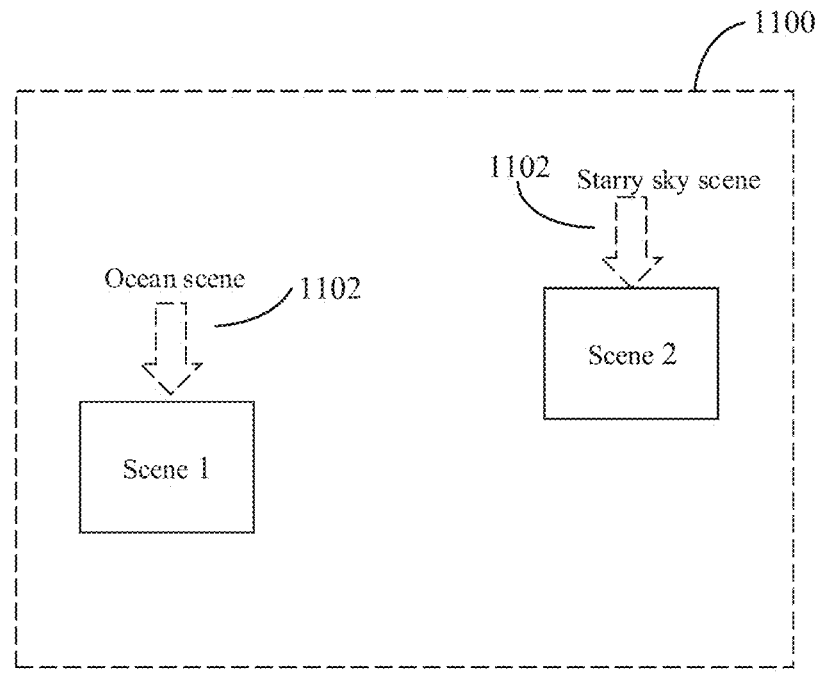
FIG. 11a is a schematic diagram of a screen displaying a scene icon according to an embodiment.
Figure 11B:
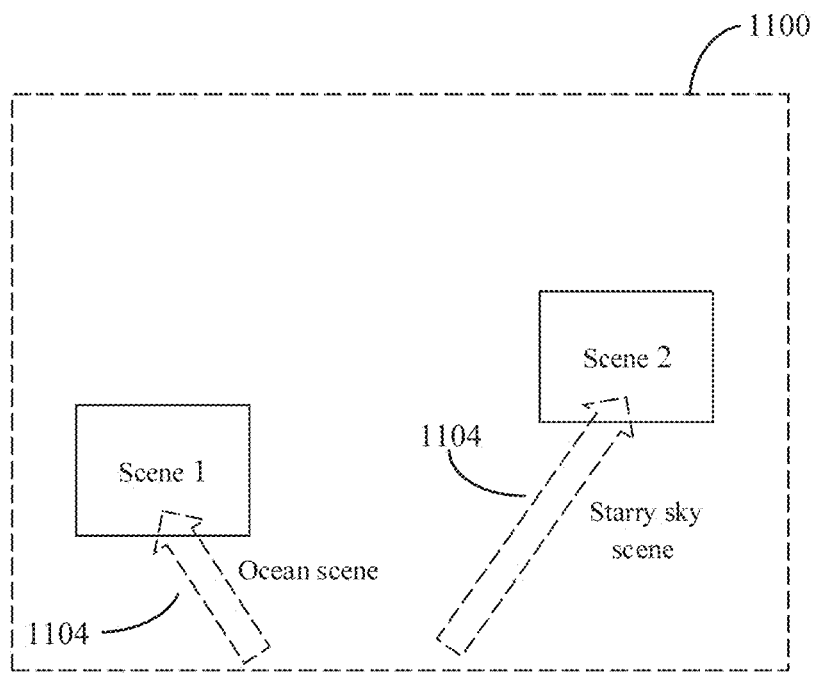
FIG. 11b is a schematic diagram of a screen displaying a scene icon according to another embodiment.

Referring to FIG. 11a and FIG. 11b, the user can observe through the terminal device that a scene 1 and a scene 2 are included in a field of view 1100. The scene 1 is an ocean scene, and the scene 2 is a starry sky scene. The scene 1 is in an upper left orientation relative to the terminal device, the scene 2 is in an upper right orientation relative to the terminal device, and the scene 2 is located farther than the scene 1. As shown in FIG. 11a, in one example, a scene icon 1102 of the ocean scene is superimposed and displayed at the position where the scene 1 is located. A scene icon 1102 of the starry sky scene is superimposed and displayed at the position where the scene 2 is located. As shown in FIG. 11b, in another example, a scene icon 1104 of the ocean scene is superimposed and displayed in an area between the terminal device and the orientation of the scene 1 (an upper left orientation), and a scene icon 1104 of the starry sky scene is superimposed and displayed in an area between the terminal device and the orientation of the scene 2 (an upper right orientation).

Figure 11C:
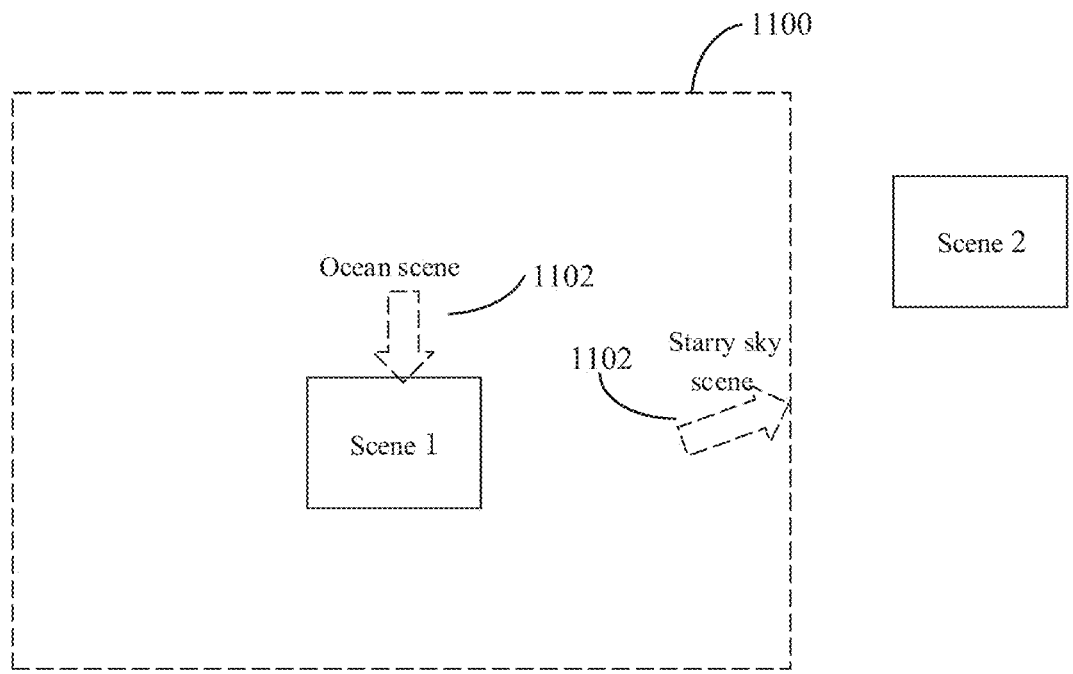
FIG. 11c is a schematic diagram of a screen displaying a scene icon according to still another embodiment; FIG.

In some embodiments, when a preset scene is located outside the field of view of the terminal device, a scene icon corresponding to the preset scene that is located outside the field of view can also be displayed, and the scene icon may be superimposed and displayed on an edge of the field of view corresponding to orientation information of the preset scene, to help the user quickly get the position of the preset scene located outside the field of view. As shown in FIG. 11c, the user can observe that, through the terminal device, the scene 1 included in the field of view 1100. The scene 2 is outside the field of view 1100, and is in the upper right orientation relative to the terminal device. The terminal device may superimpose and display the scene icon 1102 of the ocean scene at the position where the scene 1 is located, and display the scene icon 1102 of the starry sky scene on a right edge of the field of view 1100. The representation of the scene icon and the position at which the scene icon is superimposed and displayed are not limited to the ones described above and are not limited herein.

In some embodiments, in addition to the scene icon of the preset scene, an actual distance between the terminal device and the preset scene may also be displayed. In one implementation, when the terminal device is located in a scene, only the scene icon of the scene may be displayed, or the scene icon may be temporarily hidden to avoid impact on the user's observing.

In some embodiments, the pose information of the terminal device may be detected, and the orientation of the terminal device is determined according to the pose information. The orientation can be used to indicate an orientation of a human eye of the user wearing the terminal device. When the orientation of the terminal device is consistent with the orientation of the preset scene, scene description information corresponding to the preset scene with the consistent orientation information may be displayed. The scene description information may include, but not limited to, a name, an introduction (including a text and a video), and popularity (a number of visitors in a certain period of time), an expected arrival time (time expected to be taken by the user to walk to the preset scene), an expected queuing time (if too many viewers, queuing may be needed), and the like of the preset scene. In one implementation, when the preset scene is in a middle area of the field of view, that is, when the user's line of sight is directly facing the preset scene, the orientation of the terminal device may be considered to be consistent with the orientation information of the preset scene.

Figure 11D:
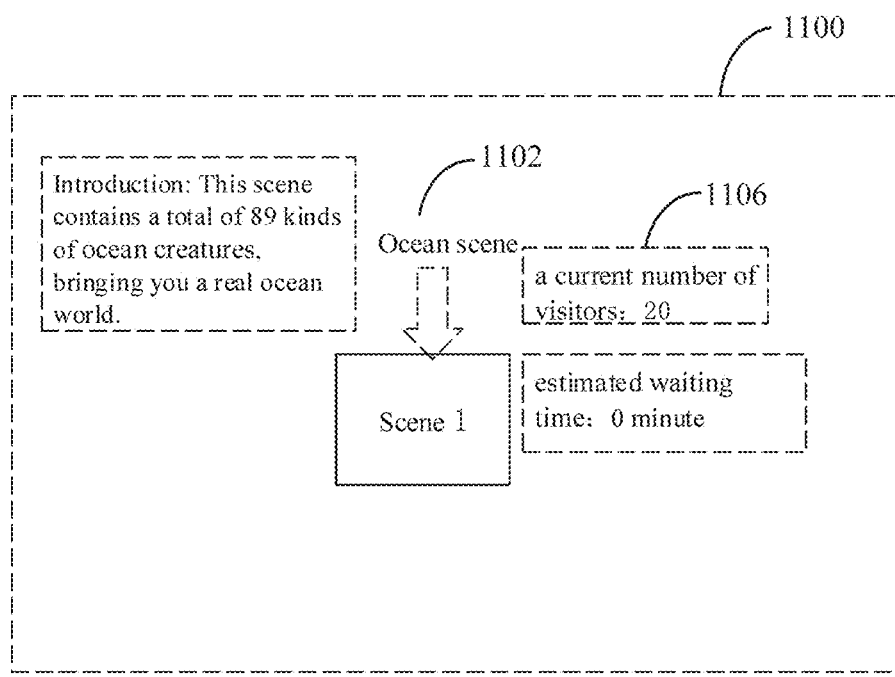
FIG. 11d is a schematic diagram of a screen for displaying scene description information according to an embodiment.

As shown in FIG. 11d, the user can observe through the terminal device that the scene 1 is included in the field of view 1100. When the orientation of the terminal device is consistent with the orientation information of the scene 1, the terminal device may display the scene icon 1102 of the ocean scene at the position where the scene 1 is located, and display the scene description information 1106 of the scene 1, which can include a current number of visitors, estimated waiting time, scene introduction and the like. In one implementation, while displaying the scene description information, the scene description may be conveyed to the user through an audio output unit of the terminal device by means of sound.

In some embodiments, when the terminal device is located in a scene, the scene icon of the scene may be displayed. In one implementation, when the terminal device is closer to the entrance or the exit of the scene, transparency of the scene icon can be reduced or the scene icon may be enlarged, thereby making the displayed scene icon more obvious. When the terminal device is farther from the entrance or the exit of the scene, the transparency of the scene icon can be increased or the scene icon can be reduced.

When the terminal device identifies a new scene marker, which indicates that the scene in which the terminal device is located has changed, the terminal device can establish a connection with a server corresponding to the located new scene based on the new scene marker, download scene data of the new scene from the server, construct the virtual content and display the new scene. When the scene where the terminal device is located changes, the terminal device can acquire a scene icon corresponding to the new scene and replace the displayed scene icon of the previous scene with the scene icon of the new scene.

In one implementation, after the user ends the use, the terminal device can also upload an operation record of the user during use to the server in a form of a log. For example, the operation record may include a scene accessed by the terminal device, an interactions and the like, so as to facilitate subsequent statistics of the user's preference and optimization of virtual display experience.

The content display method provided in the above embodiment, the terminal device can display the scene icon of each scene, identify and guide the scene, thereby enriching the visual effect, and improving the sense of reality and immersion.

In an embodiment, the present disclosure further provides an information prompting method. The terminal device captures a target image including a marker by a camera, obtains a relative spatial position relationship between the terminal device and the marker based on the target image, and generates the prompt information when the relative spatial position relationship satisfies a preset condition. The preset condition may relate to at least one of a position and a pose of the marker.

Figure 12A:
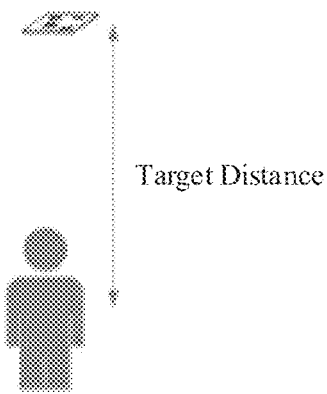
FIG. 12a is a schematic diagram of a distance between a marker and a terminal device according to an embodiment.

Referring to FIG. 12a, in some embodiments, the relative spatial position relationship includes a target distance between the terminal device and the marker. The terminal device can determine whether the target distance exceeds a first distance threshold. When the target distance exceeds the first distance threshold, prompt information is generated. In one implementation, the terminal device may analyze a contour size of the marker in the target image, and looks for the distance corresponding to the contour size of the marker in a correspondence between the distance and the contour size to determine the target distance between the terminal device and the marker. The target distance can also be obtained in real time. For example, a depth camera can be used to generate a real-time map of the distance from the marker to the camera, to obtain the distance between the terminal device and the marker in real time. In addition, the distance between the marker and the terminal device can be obtained in real time by using magnetic tracking, acoustic tracking, inertial tracking, optical tracking, or multi-sensor fusion, which is not specifically limited.

Figure 12B:
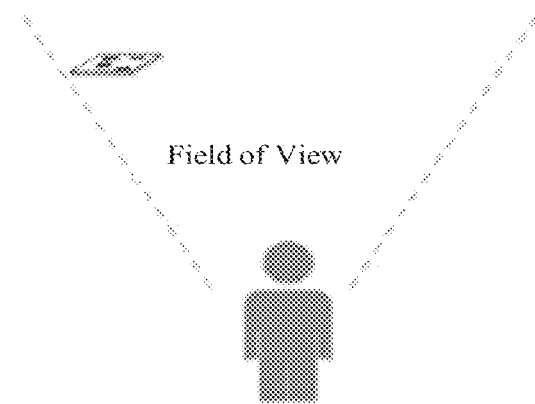
FIG. 12b is a schematic diagram of a position relationship between a marker and a boundary of a visual range of a camera in according to embodiment.
Figure 12C:
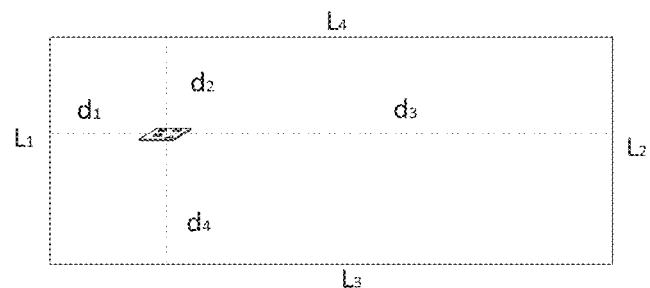
FIG. 12c is a schematic diagram of a distance between a marker and a boundary of a field of view of a camera according to an embodiment.

In some embodiments, the relative spatial position relationship includes a distance between the position of the marker and a boundary position of the visual range of the camera. The terminal device can determine whether the distance between the position of the marker and the boundary position of the visual range of the camera is smaller than a second distance threshold. When the distance is smaller than the second distance threshold, prompt information is generated. As shown in FIG. 12b, the visual range of the camera refers to a range in which the camera can capture an image, and the boundary of the visual range refers to an edge position of the area range corresponding to the visual range. In one implementation, as shown in FIG. 12c, L1 and L2 are horizontal boundaries of a horizontal field of view, L3 and L4 are vertical boundaries of a vertical field of view, a horizontal boundary of the target image can be used as the horizontal field of view, a vertical boundary can be used as the vertical field of view, and the position of the marker can be obtained by analyzing pixel coordinates of the marker in the target image. In one implementation, an intersection point of L1 and L4 is taken as an origin of the target image, the distance between the position of the marker and the boundary position of the visual range of the camera may include a distance d1 between the marker and L1, a distance d2 between the marker and L4, a distance d3 between the marker and L2, or a distance d4 between the marker and L3. A smallest distance value among d1, d2, d3, and d4 can be used as the distance between the position of the marker and the boundary position of the visual range of the camera, so as to obtain the distance between the position of the marker and the boundary position of the visual range of the camera.

Figure 12D:
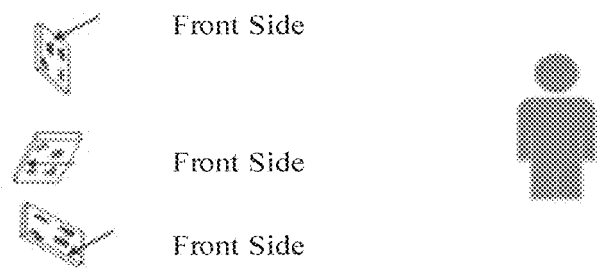
FIG. 12d is a schematic diagram of pose information of a marker relative to a terminal device according to an embodiment

In some embodiments, the relative spatial position relationship includes pose information of the marker relative to the terminal device. The pose information includes a rotation angle, the terminal device can determine whether the rotation angle exceeds a preset value, and generate prompt information when the rotation angle exceeds the preset value. As shown in FIG. 12d, the pose information of the marker relative to the terminal device includes a rotation direction and the rotation angle of the marker. In one implementation, the pose information of the marker may be determined based on target feature points of the marker, the target feature points can be a number of feature points arbitrarily selected from all feature points in the target image. According to pixel coordinates in the target image and real physical coordinates on the marker of the target feature points, the position, the rotation direction and the rotation angle of the marker relative to the terminal device can be obtained.

In some embodiments, the pose information further includes the rotation direction. The terminal device can obtain a preset value corresponding to the rotation direction, determine whether the rotation angle exceeds the preset value corresponding to the rotation direction, and generate prompt information when the rotation angle exceeds the preset value corresponding to the rotation direction. The preset value is a critical angle value that is preset. When the rotation angle exceeds the critical angle value, a front side of the marker (the side on which the marking pattern is disposed) cannot be captured by the camera.

In some embodiments, the terminal device can determine a change of the position and pose of the marker based on the position of the marker in a plurality of the target images, obtain predicted motion information of the terminal device and/or the marker based on the change of the position and pose of the marker, determine whether a preset condition is met based on the predicted motion information, and generate prompt information when the preset condition is met. The predicted motion information may include motion direction prediction, motion speed prediction, motion rotation direction prediction and the like. In one specific implementation, the terminal device may acquire several consecutive frames of historical images including the marker before the current target image, obtain pixel coordinates of the marker in each historical image, and fit a trajectory of the marker based on the pixel coordinates of the marker in the several consecutive frames of the images.

In one implementation, a motion direction can be obtained based on a change of the target distance between the terminal device and the marker, and it is determined whether or not to generate the prompt information based on the motion direction and the target distance. When the distance between the marker and the terminal device becomes smaller, that is, the marker is moving towards the terminal device, the prompt information may not be generated. When the distance between the marker and the terminal device becomes larger, that is, the marker is moving in a direction facing away from the terminal device, the prompt information can be generated.

In one implementation, it is also possible to jointly determine whether to generate the prompt information in conjunction with the motion direction of the marker and a change of the distance between the position of the marker and the boundary position of the field of view of the camera. When the distance between the position of the marker and the boundary position of the visual range of the camera is smaller than the second distance threshold, if the marker is moving towards a center of the visual range, prompt information may not be generated, and when the marker is moving towards a boundary line of the visual range, the prompt information can be generated.

It should be noted that when at least one of the three relative spatial position relationships, which include the distance between the target device and the marker, the distance between the position of the marker and the boundary position of the field of view of the camera, and the pose information of the marker relative to the terminal device, satisfies the preset condition, the terminal device can generate prompt information, and the three relative spatial position relationships can also be combined with each other to determine whether to generate the prompt information.

In one embodiment, the prompt information may include at least one of image prompting, voice prompting and vibration prompting. The image prompting can be arrow prompting, emoticon prompting or other forms of image prompting, etc. When displaying the image prompting, the position relationship between the terminal device and the marker can be displayed in real time on the terminal device, so that the user can conveniently perform a corresponding adjustment. The voice prompting can be set according to the user's preference, and the voice can be a default voice, a child voice, a star voice or the user's own voice. The vibration prompting can generate a prompt effect by a vibrator or the like, and the vibration can be continuously strengthened with a length of a prompting time.

Figure 13A:
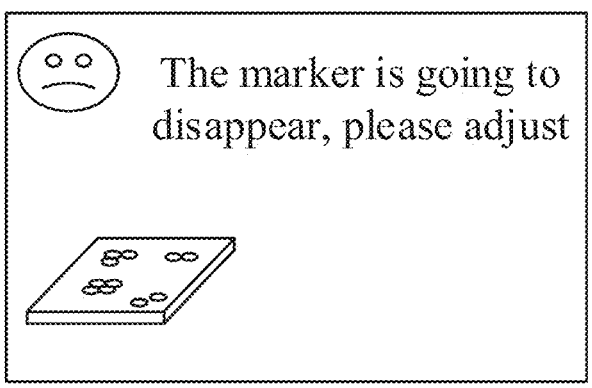
FIG. 13a is an interface diagram for prompting according to an embodiment.
Figure 13B:
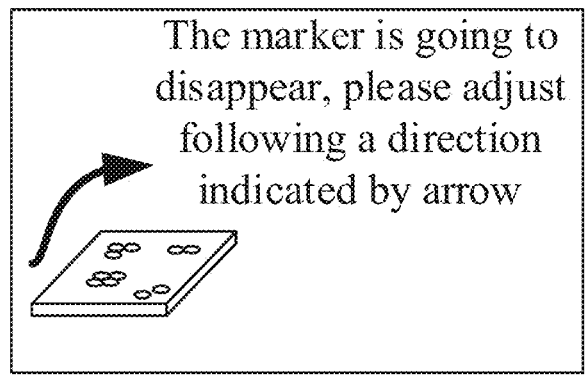
FIG. 13b is an interface diagram for prompting according to another embodiment.

For example, as shown in FIG. 13a, when the relative spatial position relationship satisfies the preset condition, the terminal device may prompt the user by a virtual "sad" expression that the marker will not be captured normally; and as shown in FIG. 13b, the "arrow" can be used to prompt the user that the marker will not be captured normally.

In some embodiments, when the marker is not within the visual range of the camera of the terminal device, six degrees of freedom information of the terminal device may be acquired in real time through a VIO, and the position and pose of the marker relative to the terminal device may be determined based on the six degrees of freedom information, so that prompt information is generated based on the position and pose of the marker. In one implementation, when the marker is within the visual range of the camera, the current position of the terminal device can be used as a starting point, and change of position and pose of the terminal device relative to the starting point is continuously calculated through the VIO. When the marker is not in the visual range, the change of position and pose of the terminal device relative to the starting point may be acquired, and the position of the starting point is re-determined, to obtain the real-time position and pose information of the marker.

In one implementation, it can also be determined whether the rotation angle of the marker exceeds a preset value, and when exceeding, prompt information can be generated. The different rotation directions of the marker can correspond to different preset values. The terminal device can obtain the rotation direction of the marker, acquire the preset value corresponding to the rotation direction based on the rotation direction, and determine whether the rotation angle exceeds the corresponding preset value.

With respect to the information prompting methods in the above embodiment, when it is detected that the relative spatial position relationship between the terminal device and the marker meets the preset condition, a case where the marker cannot be accurately identified may occur. Then, prompt information may be generated, in order to remind the user to adjust the relative spatial position relationship between the terminal device and the marker, in such a manner that the marker can be accurately identified. This can improve accuracy of the terminal device displaying the virtual content.

In one embodiment, a computer readable storage medium is further provided, and program codes are stored in the computer readable medium. The program codes can be invoked by a processor to perform the methods described in the above embodiments.

The computer readable storage medium can be an electronic memory such as a flash memory, an EEPROM (Electrically Erasable Programmable Read Only Memory), an EPROM, a hard disk, or a ROM. Optionally, the computer readable storage medium comprises a non-transitory computer-readable storage medium. The computer readable storage medium has a storage space for the program codes that perform any of the method steps described above. The program codes can be read from one or more computer program products or written into the one or more computer program products. The program codes can be, for example, compressed in an appropriate form.

Finally, it should be noted that the above embodiments are only used to illustrate the technical solutions of the present disclosure and are not limited thereto; although the present disclosure has been described in detail with reference to the above embodiments, those of ordinary skill in the art will understand that they can still modify the technical solutions described in each of the above embodiments or equivalently substitute some of the technical features; these modifications and substitutions do not make essence of the corresponding technical solutions depart from the spirit and scope of the technical solutions of each of the embodiments of the present disclosure.

What is claimed is:

1. A communication connection method, comprising: capturing an image containing a marker, obtaining a relative spatial position relationship between the terminal device and the marker based on the target image, and generating the prompt information when the relative spatial position relationship satisfies a preset condition, and thereby identifying the marker in the image, wherein the preset condition is at least one of a position and a pose of the marker;
   acquiring an identifier of a controller corresponding to the marker when the marker is a controller marker, the identifier being used for pairing during a communication connection with the controller; and
   establishing the communication connection with the controller based on the identifier; and
   after identifying the marker in the image:
   when the marker is a scene marker, acquiring a wireless network connection password corresponding to a current scene based on the scene marker; and
   establishing a connection with a wireless router of the current scene by using the wireless network connection password, the wireless router of a same scene and a plurality of controllers forming a wireless mesh network.

2. The method according to claim 1, wherein said acquiring the identifier of the controller corresponding to the marker comprises:
   scanning an identifier broadcast by the controller;
   matching the scanned identifier with the marker; and
   determining that the scanned identifier is the identifier of the controller corresponding to the marker when the matching is successful.

3. The method according to claim 2, wherein the identifier comprises a scene identification of the controller; and
   the method further comprises, after scanning the identifier broadcast by the controller:
   matching the scene identification contained in the scanned identifier with a scene identification of a current scene.

4. The method according to claim 1, wherein said establishing the communication connection with the controller based on the identifier comprises:
   detecting a position of the controller, and when the controller is located at a preset position, establishing the communication connection with the controller based on the identifier.

5. The method according to claim 1, further comprising, after identifying the marker in the image:
   generating connection prompt information when the marker is the controller marker, the connection prompt information being used to prompt establishing the communication connection with the controller.

6. A terminal device, comprising a memory and a processor, the memory being coupled to the processor, wherein the memory stores a computer program, and the computer program, when being executed by the processor, causes the processor to perform steps of:
   capturing an image containing a marker, obtaining a relative spatial position relationship between the terminal device and the marker based on the target image, and generating the prompt information when the relative spatial position relationship satisfies a preset condition, and thereby identifying the marker in the image, wherein the preset condition is at least one of a position and a pose of the marker;
   acquiring an identifier of a controller corresponding to the marker when the marker is a controller marker, the identifier being used for pairing during a communication connection with the controller; and establishing the communication connection with the controller based on the identifier; and
after identifying the marker in the image:
when the marker is a scene marker, acquiring a wireless network connection password corresponding to a current scene based on the scene marker; and
establishing a connection with a wireless router of the current scene by using the wireless network connection password, the wireless router of a same scene and a plurality of controllers forming a wireless mesh network.

7. The terminal device according to claim 6, wherein said acquiring the identifier of the controller corresponding to the marker comprises:
scanning an identifier broadcast by the controller;
matching the scanned identifier with the marker; and
determining that the scanned identifier is the identifier of the controller corresponding to the marker when the matching is successful.

8. The terminal device according to claim 7, wherein the identifier comprises a scene identification of the controller; and
after executing the step of scanning the identifier broadcast by the controller, the processor further executes a step of:
matching the scene identification contained in the scanned identifier with a scene identification of a current scene.

9. The terminal device according to claim 6, wherein said establishing the communication connection with the controller based on the identifier comprises:
detecting a position of the controller, and when the controller is located at a preset position, establishing the communication connection with the controller based on the identifier.

10. The terminal device according to claim 6, wherein after executing the step of identifying the marker in the image, the processor further executes a step of:
generating connection prompt information when the marker is the controller marker, the connection prompt information being used to prompt establishing the communication connection with the controller.

11. A wireless communication system, comprising:
at least one marker;
at least one controller provided with the at least one marker; and
at least one terminal device configured to identify the at least one marker provided on the at least one controller, acquire an identifier of each of the at least one controller, and establish a communication connection with the at least one controller based on the identifier,
the at least one terminal device obtaining a relative spatial position relationship between the terminal device and the marker based on the target image, wherein when the relative spatial position relationship satisfies a preset condition, the at least one terminal device generates the prompt information, and wherein the preset condition is at least one of a position and a pose of the marker; and
after identifying the marker in the image:
when the marker is a scene marker, acquiring a wireless network connection password corresponding to a current scene based on the scene marker; and
establishing a connection with a wireless router of the current scene by using the wireless network connection password, the wireless router of a same scene and a plurality of controllers forming a wireless mesh network.

12. The system according to claim 11, further comprising:
at least one wireless router configured to establish a communication connection with the at least one terminal device and/or the at least one controller,
wherein when the at least one wireless router has established the communication connection with a plurality of controllers, the at least one wireless router forms a wireless mesh network with the plurality of controllers.

13. The system according to claim 12, wherein the at least one terminal device is further configured to generate wait prompt information when there is another controller being paired in the wireless mesh network, and the wait prompt information is used to prompt waiting for completion of pairing of the another controller.

14. The system according to claim 11, wherein the at least one controller is further configured to broadcast the identifier, and
the at least one terminal device is further configured to scan the identifier broadcast by the at least one controller, match the scanned identifier with the identified marker, and determine that the scanned identifier is the identifier of each of the at least one controller corresponding to the identified marker when the matching is successful.

15. The method according to claim 1, the relative spatial position relationship comprising a target distance between the terminal device and the marker, wherein when the target distance exceeds the first distance threshold, prompt information is generated;
the relative spatial position relationship comprising a distance between the position of the marker and a boundary position of the visual range of the camera, wherein when the distance between the position of the marker and the boundary position of the visual range of the camera is smaller than a second distance threshold, prompt information is generated; and
the relative spatial position relationship comprising pose information of the marker relative to the terminal device, the pose information comprising a rotation angle, wherein when the rotation angle exceeds a preset value, prompt information is generated.

16. The terminal device according to claim 6, the relative spatial position relationship comprising a target distance between the terminal device and the marker, wherein the terminal device determines whether the target distance exceeds the first distance threshold, and when the target distance exceeds the first distance threshold, the terminal device generates prompt information;
the relative spatial position relationship comprising a distance between the position of the marker and a boundary position of the visual range of the camera, wherein the terminal device determines whether the distance between the position of the marker and the boundary position of the visual range of the camera is smaller than a second distance threshold, and when the distance between the position of the marker and the boundary position of the visual range of the camera is smaller than a second distance threshold, the terminal device generates prompt information; and
the relative spatial position relationship comprising pose information of the marker relative to the terminal device, the pose information comprising a rotation angle, and the terminal device determines whether the rotation angle exceeds a preset value, and when the rotation angle exceeds a preset value, the terminal device generates prompt information.

17. The wireless communication system according to claim 11, the relative spatial position relationship comprising a target distance between the terminal device and the marker, wherein the at least one terminal device determines whether the target distance exceeds the first distance threshold, and when the target distance exceeds the first distance threshold, the at least one terminal device generates prompt information;

the relative spatial position relationship comprising a distance between the position of the marker and a boundary position of the visual range of the camera, wherein the at least one terminal device determines whether the distance between the position of the marker and the boundary position of the visual range of the camera is smaller than a second distance threshold, and when the distance between the position of the marker and the boundary position of the visual range of the camera is smaller than a second distance threshold, the at least one terminal device generates prompt information; and the relative spatial position relationship comprising pose information of the marker relative to the terminal device, the pose information comprising a rotation angle, wherein the at least one terminal device is configured to determine whether the rotation angle exceeds a preset value and when the rotation angle exceeds a preset value, the at least one terminal device generates prompt information.

* * * * *